United States Patent
Pulos

(10) Patent No.: US 6,302,169 B1
(45) Date of Patent: Oct. 16, 2001

(54) DIESEL FUEL NOZZLE RESTRICTOR

(76) Inventor: Peter C. Pulos, W315 S2828 Roberts Rd., Waukesha, WI (US) 53188

( * ) Notice: Subject to any disclaimer, the term of this patent is extended or adjusted under 35 U.S.C. 154(b) by 0 days.

(21) Appl. No.: 09/660,751

(22) Filed: Sep. 13, 2000

(51) Int. Cl.$^7$ ...................................................... B65B 1/04
(52) U.S. Cl. ........................ 141/301; 141/350; 220/86.2
(58) Field of Search ............................ 141/301, 348–350; 220/86.2

(56) References Cited

U.S. PATENT DOCUMENTS

| | | | |
|---|---|---|---|
| 3,730,216 | 5/1973 | Arnett et al. | 137/588 |
| 5,435,358 | * 7/1995 | Kempka et al. | 141/312 |
| 6,189,581 | * 2/2001 | Harris et al. | 141/348 |

* cited by examiner

*Primary Examiner*—Steven O. Douglas
(74) *Attorney, Agent, or Firm*—Donald J. Ersler

(57) ABSTRACT

A diesel fuel nozzle restrictor includes an attachment flange, nozzle tube, at least one release arm, and closure cap. A top of the attachment flange is structured to receive a fuel cap. A bottom of the attachment flange is structured to be attached to an existing diesel fuel filler neck. The nozzle tube also extends from a bottom of the attachment flange. The closure cap is pivotally attached to a bottom of the nozzle tube. Each release arm is preferably attached to the nozzle tube at substantially a top thereof. A capture ledge is formed on an end of each release arm to restrict pivoting movement of the closure cap. An actuation projection is formed at substantially an end of each release arm. An opening is formed through the wall of the nozzle tube to receive the actuation projection. Insertion of the diesel fuel nozzle through the nozzle tube will cause the closure cap to open after the at least one capture ledge is removed from a bottom of the closure cap. In a second embodiment, an attachment flange is formed as an integral part of the opening of a diesel fuel filler neck.

16 Claims, 7 Drawing Sheets

DIESEL FUEL NOZZLE RESTRICTOR

BACKGROUND OF THE INVENTION

1. Field of the Invention

The present invention relates generally to fuel nozzle restrictors and more specifically to a diesel fuel nozzle restrictors which prevents an unleaded gas nozzle from being used to fill a diesel fuel tank.

2. Discussion of the Prior Art

Currently, it appears that there is not a cost effective way of preventing a diesel fuel tank from being filled with unleaded gas. The consequences of running unleaded gas in a diesel engine may be catastrophic. The engine will at the very least need some repair and at the worst replacement. Unleaded fuel does not have the lubrication properties of diesel fuel and would result in ring an bearing failure if used in a diesel engine. U.S. Pat. No. 3,720,216 to Arnett et al. does disclose a nozzle restrictor, however the restrictor prevents a nozzle which is larger in diameter than a smaller unleaded fuel nozzle from filling the gas tank.

Before the introduction of unleaded fuels in 1974, automotive manufacturers needed to protect catalytic converters from being destroyed by leaded fuels. Arnett developed his device to restrict the burning of leaded fuels as required by the Environmental Protection Agency and to prevent damage to catalytic converters. An unleaded nozzle is smaller in diameter than the diesel nozzle and a leaded fuel nozzle is the same diameter as a diesel nozzle. A drawback to the Arnett device is that it may be tricked into opening by rocking an end of the unleaded nozzle in the discharge tube.

Accordingly, there is a clearly felt need in the art for a diesel fuel nozzle restrictor which prevents a diesel tank from being filled with unleaded gasoline.

SUMMARY OF THE INVENTION

The present invention provides a diesel fuel nozzle restrictor which prevents a nondiesel nozzle from being inserted into a filling spout of a diesel engine. The diesel fuel nozzle restrictor includes an attachment flange, nozzle tube, at least one release arm, and pivoting door. A top of the attachment flange is structured to receive a fuel cap. A bottom of the attachment flange is structured to be attached to an existing diesel vehicle fuel filler neck. The nozzle tube also extends from a bottom of the attachment flange. The closure cap is pivotally attached to a bottom of the nozzle tube. Each release arm is preferably attached to the nozzle tube at substantially a top thereof. The release arm is preferably fabricated from a strip of spring steel. A capture ledge is formed on an end of each release arm to restrict pivotal movement of the closure cap.

An actuation projection is formed at substantially an end of each release arm. An opening is formed through the wall of the nozzle tube to receive the actuation projection. To open the closure cap of the diesel fuel nozzle restrictor, the nozzle is inserted into the nozzle tube. The outer diameter of the diesel nozzle pushes the at least one release arm away from the nozzle tube and releases the capture ledge from under the closure cap. Insertion of the diesel fuel nozzle through the nozzle tube will cause the closure cap to open after the at least one capture ledge is removed from a bottom of the closure cap. In a second embodiment, an attachment flange is formed as an integral part of the opening of a diesel fuel filler neck.

Accordingly, it is an object of the present invention to provide a diesel fuel nozzle restrictor which prevents a diesel fuel tank from being filled with unleaded gasoline from an unleaded fuel nozzle.

It is a further object of the present invention to provide a diesel fuel nozzle restrictor which may be attached to an existing diesel fuel filler neck, while utilizing the existing fuel cap.

It is yet a further object of the present invention to provide a diesel fuel nozzle restrictor which may be formed as an integral part of a diesel fuel filler neck.

It is yet a further object of the present invention to provide a diesel fuel nozzle restrictor which prevents a diesel fuel tank from being filled with unleaded gasoline and save man hours that would be required to remove the unleaded fuel from the tank.

It is yet a further object of the present invention to provide a diesel fuel nozzle restrictor which prevents a diesel fuel tank from being filled with unleaded gasoline and save fuel that would have to be discarded.

It is yet a further object of the present invention to provide a diesel fuel nozzle restrictor which prevents a diesel fuel tank from being filled with unleaded gasoline and the problem of disposing of the unusable unleaded and diesel fuel mixture.

Finally, it is another object of the present invention to provide a diesel fuel nozzle restrictor which prevents a diesel engine from being damaged by unleaded gasoline.

These and additional objects, advantages, features and benefits of the present invention will become apparent from the following specification.

DETAILED DESCRIPTION OF THE PREFERRED EMBODIMENTS

Figure 1:
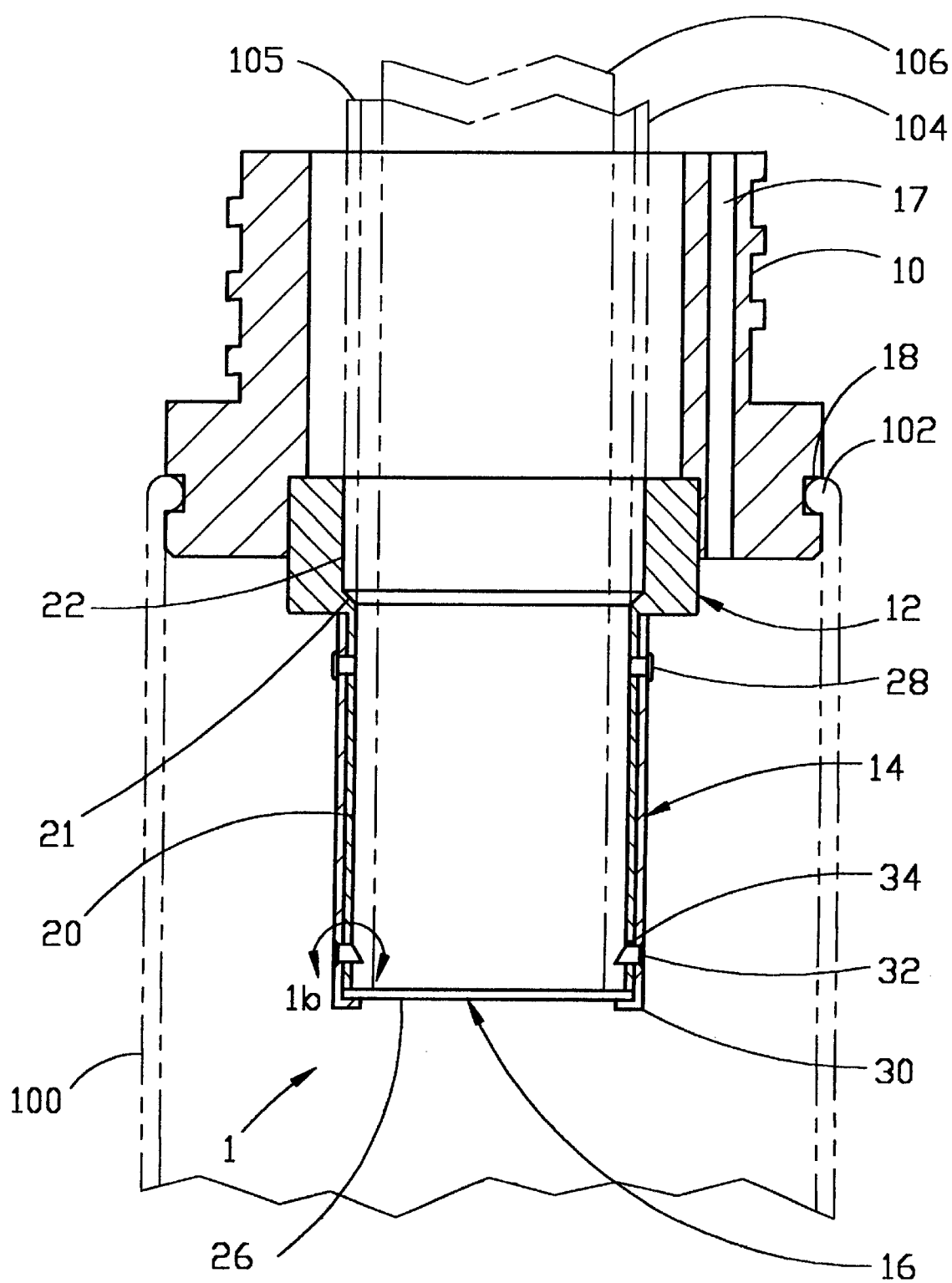
FIG. 1 is a cross sectional view of a diesel fuel nozzle restrictor with the closure cap in a closed position in accordance with the present invention.
Figure 1A:
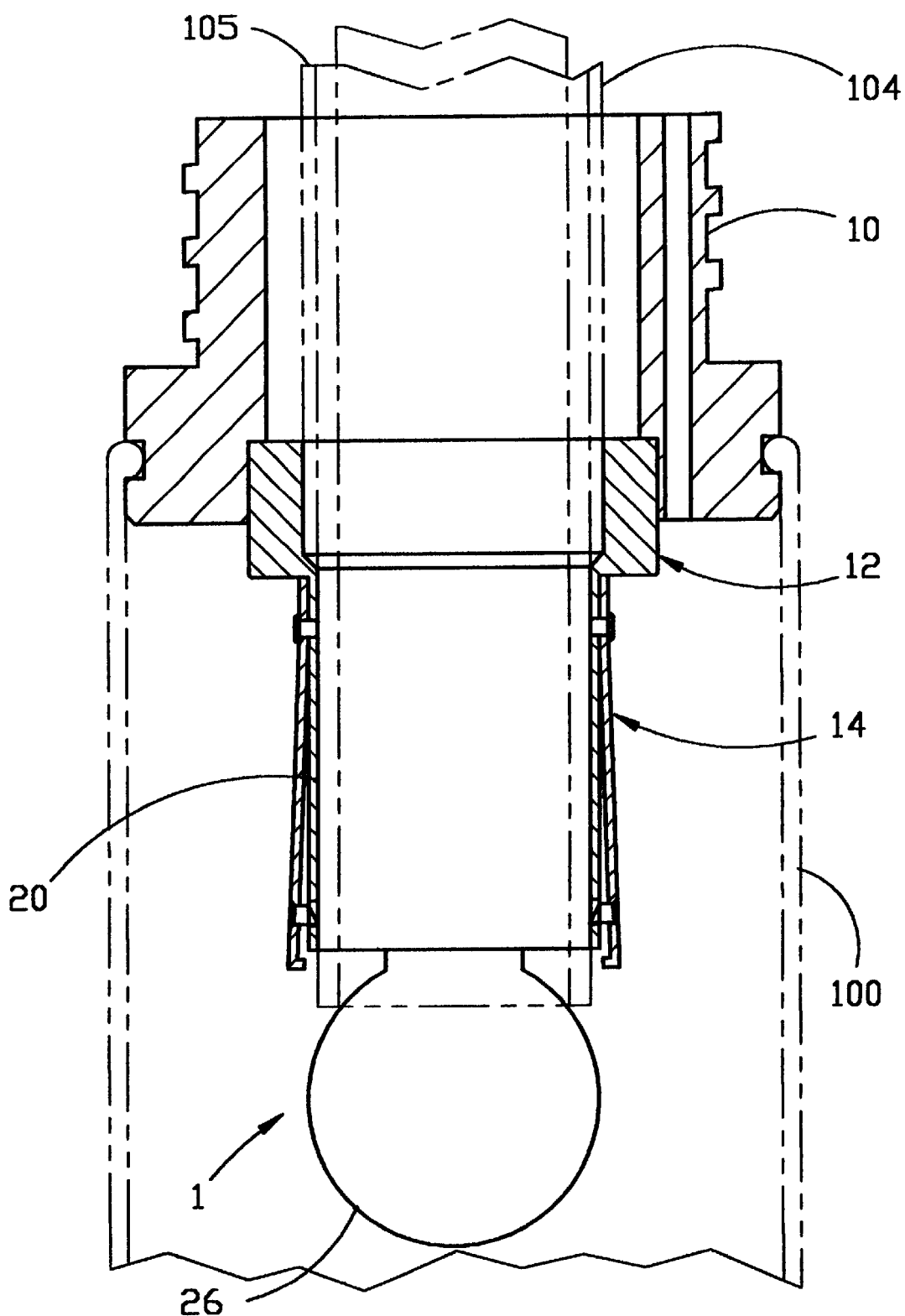
FIG. 1a is a cross sectional view of a diesel fuel nozzle restrictor with the closure cap in an open position in accordance with the present invention.

With reference now to the drawings, and particularly to FIG. 1, there is shown a cross sectional view of a diesel fuel nozzle restrictor 1. With reference to FIGS. 1a–4, the diesel fuel nozzle restrictor 1 includes an attachment flange 10, nozzle tube 12, at least one release arm 14, and closure cap 16. A top of the attachment flange 10 is structured to receive a fuel cap. The top of the attachment flange 10 could have external threads (as shown in FIG. 1 to receive a fuel cap with internal threads), internal threads, or be modified in any other way to receive a fuel cap. At least one vent hole 17 is preferably formed through the attachment flange 10. A bottom of the attachment flange 10 is structured to be attached to an existing diesel fuel filler neck 100. The bottom of the attachment flange 10 could have a groove 18 which is sized to receive an internal lip 102 of the diesel fuel filler neck 100. The nozzle tube 12 also extends from a bottom of the attachment flange 10. The nozzle tube 12 and the attachment flange 10 could be made from a single piece of material, or the nozzle tube 12 and the attachment flange 10 made be made of separate pieces. If the attachment flange 10 and the nozzle tube 12 are made of separate pieces, the nozzle tube 12 may be press fit into the attachment flange 10, screwed into the attachment flange 10, or assembled with any other suitable process.

The nozzle tube 12 preferably includes a nozzle bore 20 and a lead-in bore 22 which guides a diesel fuel nozzle 104 into the nozzle bore 20. The lead-in bore 22 also supports the coil spring 105 around the diesel nozzle and limits the travel of the nozzle tip. The nozzle bore 20 loosely receives the outer diameter of the diesel fuel nozzle 104. The transition shoulder 21 is preferably a 45 degree angle. Other angles may also be acceptable. The closure cap 16 includes an attachment plate 24 and a door 26. The closure cap 16 is preferably purchased from Gits Manufacturing of Iowa. The attachment plate 24 is preferably welded to a bottom side wall of the nozzle tube 12. An end of the door 26 is pivotally attached to the attachment plate 24. The nozzle tube 12 contains a torsion spring which forces the door 26 against a bottom of the nozzle tube 12 to prevent unauthorized fuel from entering the diesel fuel tank. Other designs of closure caps and other methods of door closure may also be used beside pivotal. A top of each release arm 14 is preferably attached to the nozzle tube 12 at substantially a top thereof with a fastener 28. Other methods of attaching each release arm 14 to the nozzle tube 12 may also be used. The release arm 14 is preferably fabricated from a strip of spring steel. A capture ledge 30 is formed on an end of each release arm 14 to restrict pivoting movement of the door 26. Other designs of release devices and retaining the closure of the door 26 may also be used besides the release arm 14.

Figure 1B:
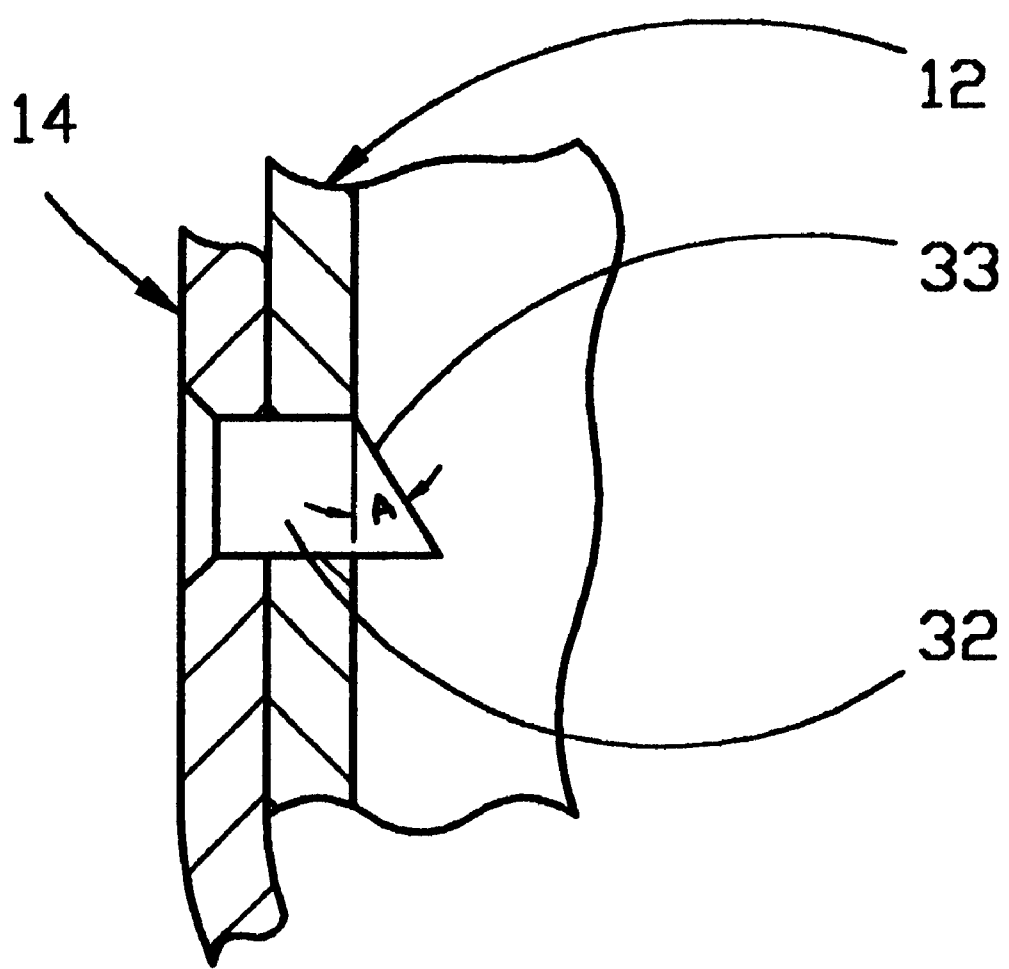
FIG. 1b is an enlarged cross sectional view of an actuation projection of a diesel fuel nozzle restrictor in accordance with the present invention.
Figure 2:
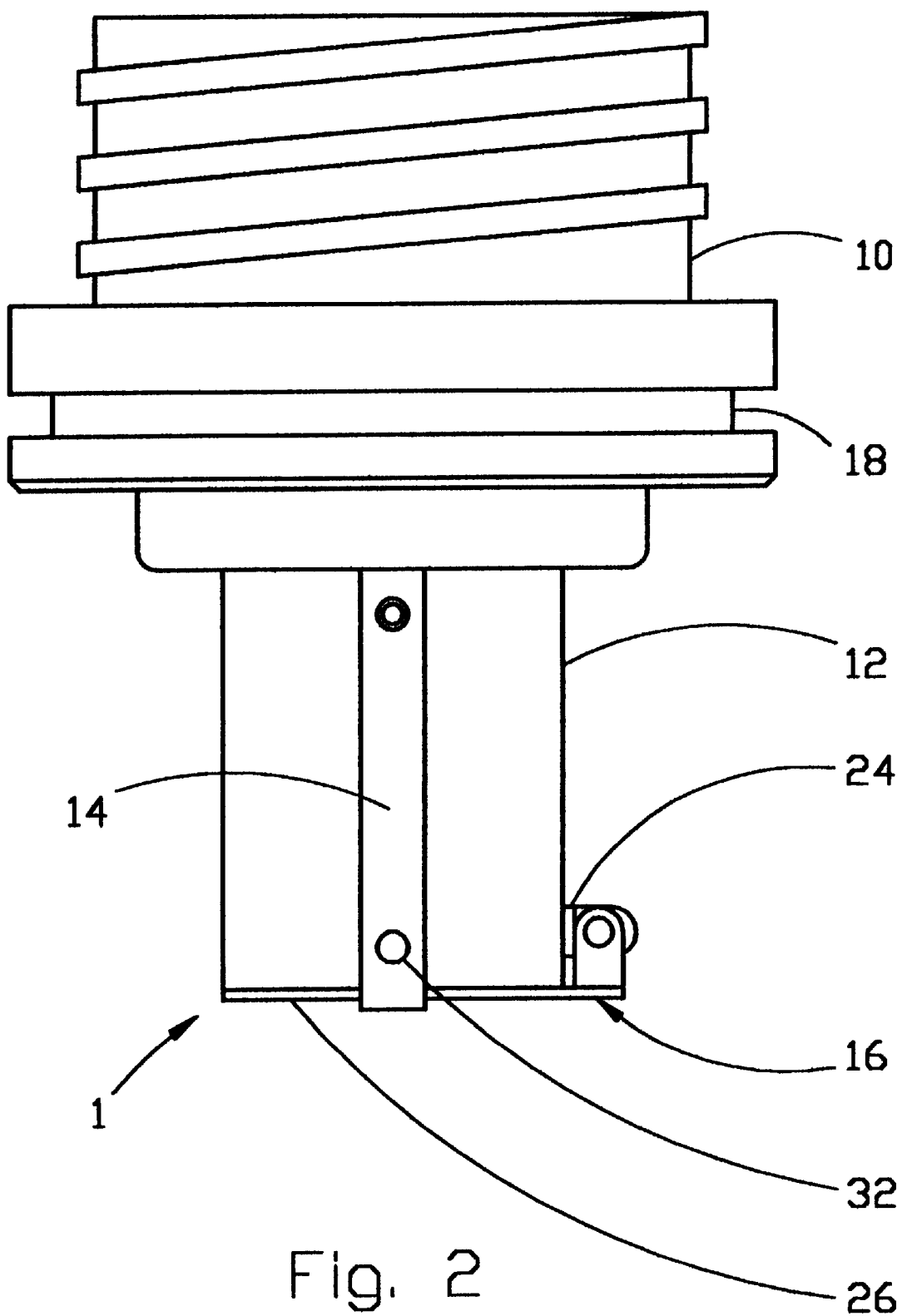
FIG. 2 is a side view of a diesel fuel nozzle inside a diesel fuel filler neck in accordance with the present invention.
Figure 3:
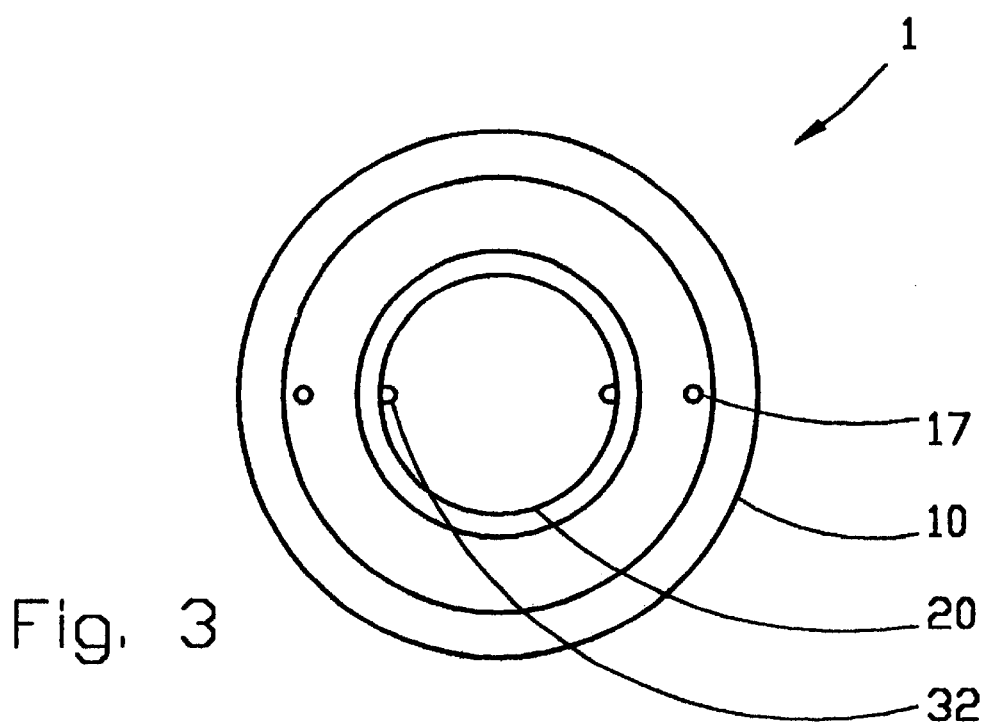
FIG. 3 is a top view of a diesel fuel nozzle restrictor in accordance with the present invention.
Figure 4:
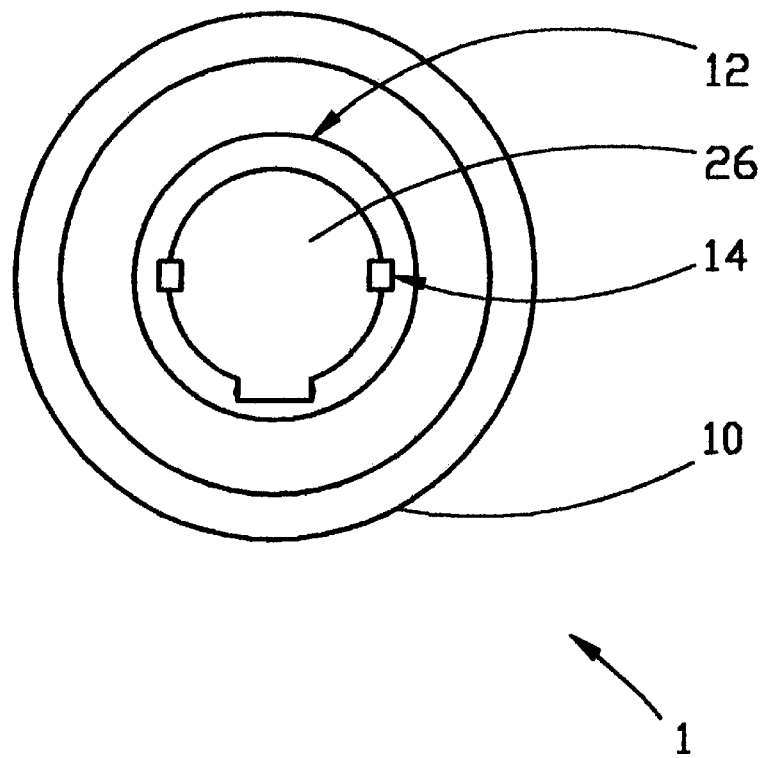
FIG. 4 is a bottom view of a diesel fuel nozzle restrictor in accordance with the present invention.

An actuation projection 32 is formed at substantially a bottom of each release arm 14. An opening 34 is formed through the wall of the nozzle tube 12 to receive the actuation projection 32. FIG. 1b shows an enlarged view of the actuation projection 32. A tapered surface 33 is preferably formed on the end of the actuation projection 32, other shapes may also be formed on the end of the actuation projection 32. The angle "A" of the tapered surface 33 preferably has a value of between 20–40 degrees. To open the door 26 of the diesel fuel nozzle restrictor, the diesel fuel nozzle 104 is inserted through the nozzle bore 20. The outer diameter of the diesel fuel nozzle 104 pushes at least one actuation projection 32 out of the nozzle bore 20. The outward movement of each actuation projection 32 removes each capture ledge 30 from under the door 26. The lack of support by the at least one capture ledge 30 allows insertion of the diesel fuel nozzle 104 through the nozzle bore 20 to push the door 26 open. Other designs of actuation projections may be used, such as the "portion 66" disclosed in U.S. Pat. No. 3,720,216 to Arnett et al.

An unleaded fuel nozzle 106 is smaller in diameter than the diesel fuel nozzle 104. When the unleaded fuel nozzle 106 is inserted into the nozzle bore 20, it will not open the door 26. Even if the unleaded fuel nozzle 106 is rocked or pried it will only push out one of the capture ledges 30. The door 26 cannot be pushed open with the release of only one release arm 14. If only one release arm 14 is used, the unleaded fuel nozzle 106 could pry open the door 26. However, one release arm could be used if the spring force of a single release arm 12 is strong enough to resist being rocked or pried open.

Figure 5:
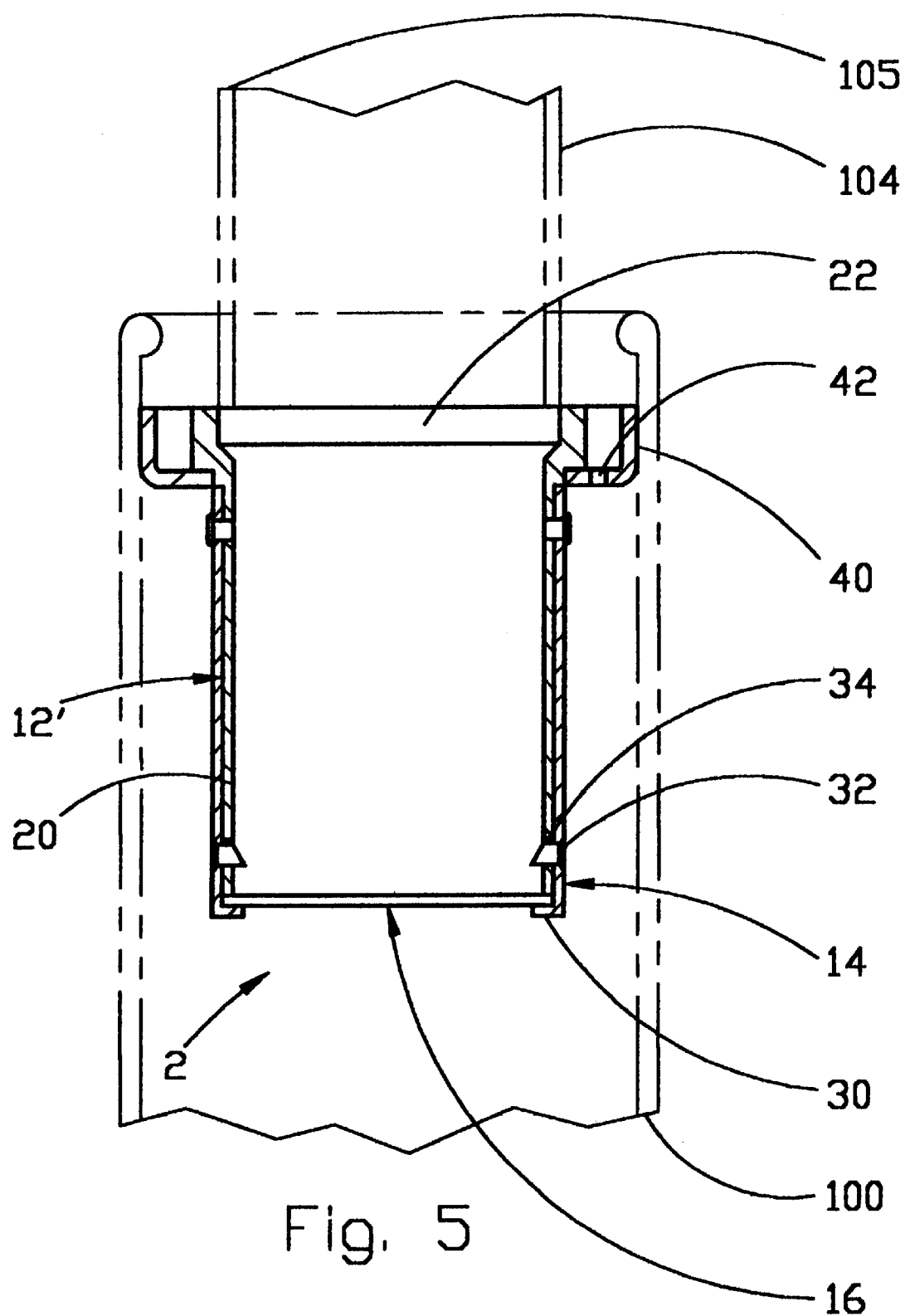
FIG. 5 is a cross sectional view of a second embodiment of a diesel fuel nozzle restrictor in accordance with the present invention.
Figure 6:
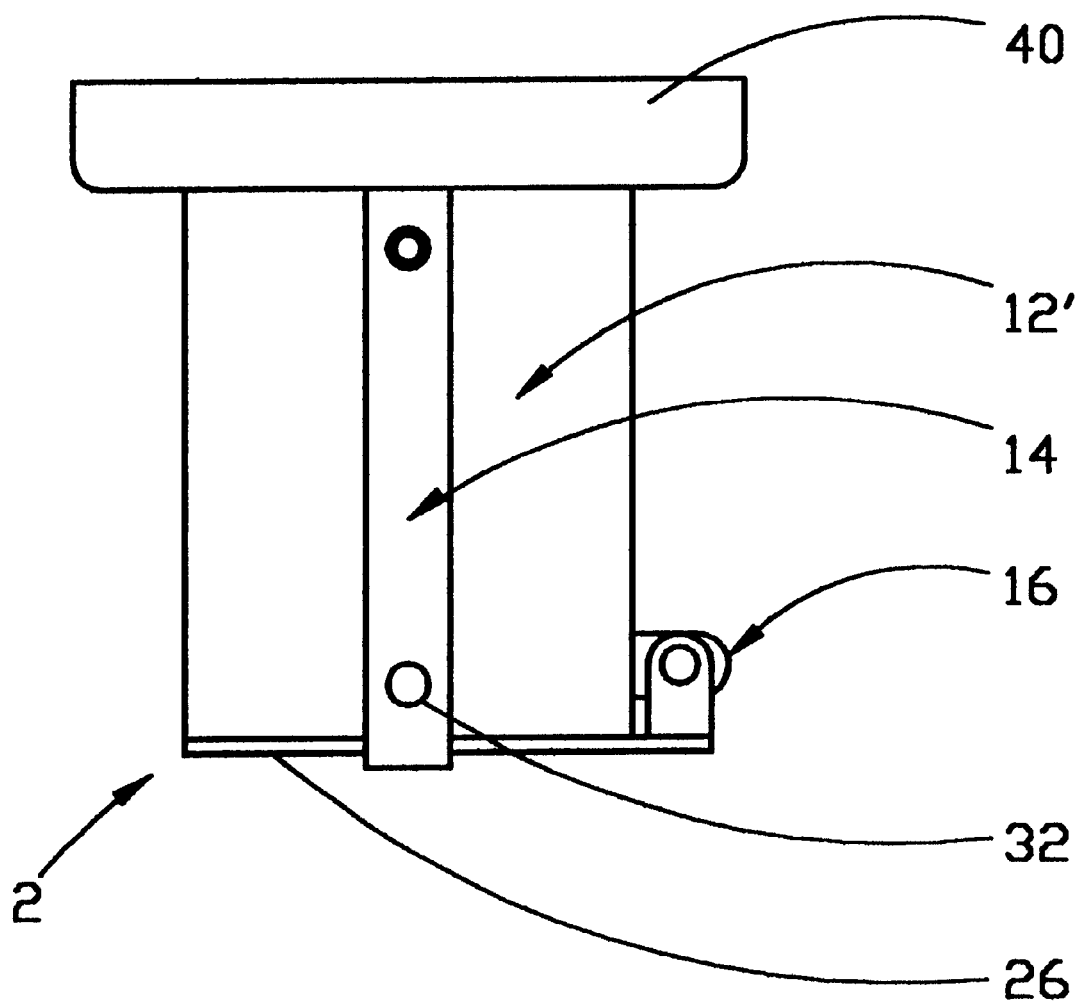
FIG. 6 is a side view of a second embodiment of a diesel fuel nozzle in accordance with the present invention.

FIGS. 5 and 6 show a second embodiment of the diesel fuel nozzle restrictor 2. The diesel fuel nozzle restrictor 2 has an attachment flange 40 which is formed as an integral part of the opening of a diesel fuel filler neck 100. The diesel fuel nozzle restrictor 2 includes an attachment flange 40, nozzle tube 12', at least one release arm 14, and closure cap 16. The attachment flange 40 is preferably welded to an inside of the diesel nozzle filler neck 100; other suitable assembly methods may also be used besides welding. At least one vent hole 42 is preferably formed through the attachment flange 40. The nozzle tube 12' may be press fit to the attachment flange 40, screwed into the attachment flange 40, welded to the attachment flange 40, or attached to the attachment flange 40 with any suitable process. The remaining elements of the diesel nozzle restrictor 2 are the same as the diesel nozzle restrictor 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A diesel nozzle restrictor for preventing the filling of a diesel fuel tank with an unleaded fuel nozzle comprising:

an attachment flange having a top which is structured to receive a fuel cap, a bottom of said attachment flange which is structured to receive an end of a diesel fuel filler neck;

a nozzle tube extending from a bottom of said attachment flange, a nozzle bore being formed through said nozzle tube;

a closure cap being pivotally attached to a bottom of said nozzle tube;

at least one release arm being attached to a top of said nozzle tube, a projection extending from each said release arm, said projection extending through a wall of said nozzle tube into said nozzle bore, a ledge being formed at an end of said release arm, said ledge preventing said closure cap from pivoting open, wherein insertion of a diesel fuel nozzle pushing said projection back and removing said ledge from under said closure cap and allowing the diesel fuel nozzle to push open said closure cap.

2. The diesel nozzle restrictor for preventing the filling of a diesel fuel tank with an unleaded fuel nozzle of claim 1, further comprising:

said closure cap having a spring and a door, said spring biasing said door to be normally closed.

3. The diesel nozzle restrictor for preventing the filling of a diesel fuel tank with an unleaded fuel nozzle of claim 1 wherein:

a lead-in bore being formed before said nozzle bore, said lead-in bore guiding the diesel fuel nozzle into said nozzle bore.

4. The diesel nozzle restrictor for preventing the filling of a diesel fuel tank with an unleaded fuel nozzle of claim 1 wherein:

said release arm being fabricated from a strip of spring steel.

5. The diesel nozzle restrictor for preventing the filling of a diesel fuel tank with an unleaded fuel nozzle of claim 1 wherein:

a groove being formed in a bottom of said attachment flange, said groove being sized to be received by an inside lip of the diesel fuel filler neck.

6. A diesel nozzle restrictor for preventing the filling of a diesel fuel tank with an unleaded fuel nozzle comprising:

an attachment flange having a top which is structured to receive a fuel cap, a bottom of said attachment flange which is structured to receive an end of a diesel fuel filler neck;

a nozzle tube extending from a bottom of said attachment flange, a nozzle bore being formed through said nozzle tube;

a closure cap being pivotally attached to a bottom of said nozzle tube;

at least two release arms being attached to a top of said nozzle tube, a projection extending from each said release arm, said projection extending through a wall of said nozzle tube into said nozzle bore, a ledge being formed at an end of said release arm, said ledge preventing said closure cap from pivoting open, wherein insertion of a diesel fuel nozzle pushing said projection back and removing said ledge from under said pivot door and allowing the diesel fuel nozzle to push open said closure cap, an unleaded fuel nozzle not being capable of opening said closure cap.

7. The diesel nozzle restrictor for preventing the filling of a diesel fuel tank with an unleaded fuel nozzle of claim 6, further comprising:

said closure cap having a spring and a door, said spring biasing said door to be normally closed.

8. The diesel nozzle restrictor for preventing the filling of a diesel fuel tank with an unleaded fuel nozzle of claim 6 wherein:

a lead-in bore being formed before said nozzle bore, said lead-in bore guiding the diesel fuel nozzle into said nozzle bore.

9. The diesel nozzle restrictor for preventing the filling of a diesel fuel tank with an unleaded fuel nozzle of claim 6 wherein:

said release arm being fabricated from a strip of spring steel.

10. The diesel nozzle restrictor for preventing the filling of a diesel fuel tank with an unleaded fuel nozzle of claim 6 wherein:

a groove being formed in a bottom of said attachment flange, said groove being sized to be received by an inside lip of the diesel fuel filler neck.

11. A diesel nozzle restrictor for preventing the filling of a diesel fuel tank with an unleaded fuel nozzle comprising:

an attachment flange being attached to a diesel fuel filler neck;

a nozzle tube extending from a bottom of said attachment flange, a nozzle bore being formed through said nozzle tube;

a closure cap being pivotally attached to a bottom of said nozzle tube;

at least two release arms being attached to a top of said nozzle tube, a projection extending from each said release arm, said projection extending through a wall of said nozzle tube into said nozzle bore, a ledge being formed at an end of said release arm, said ledge preventing said closure cap from pivoting open, wherein insertion of a diesel fuel nozzle pushing said projection back and removing said ledge from under said closure cap and allowing the diesel fuel nozzle to push open said closure cap.

12. The diesel nozzle restrictor for preventing the filling of a diesel fuel tank with an unleaded fuel nozzle of claim 11, further comprising:

said closure cap having a spring and a door, said spring biasing said door to be normally closed.

13. The diesel nozzle restrictor for preventing the filling of a diesel fuel tank with an unleaded fuel nozzle of claim 11 wherein:

a lead-in bore being formed before said nozzle bore, said lead-in bore guiding the diesel fuel nozzle into said nozzle bore.

14. The diesel nozzle restrictor for preventing the filling of a diesel fuel tank with an unleaded fuel nozzle of claim 11 wherein:

said release arm being fabricated from a strip of spring steel.

15. The diesel nozzle restrictor for preventing the filling of a diesel fuel tank with an unleaded fuel nozzle of claim 11 wherein:

a groove being formed in a bottom of said attachment flange, said groove being sized to be received by an inside lip of the diesel fuel filler neck.

16. A method of preventing a diesel fuel tank from being filed with unleaded fuel, comprising the steps of:

(a) attaching a nozzle tube to an inside of a diesel fuel filler neck;

(b) providing a releasable door at a bottom of said nozzle tube;

(c) providing at least one release arm, an end of said at least one release arm preventing said releasable door from opening;

(d) providing at least two actuation projections which protrude through said nozzle tube, said actuation projections being loaded such that they resist outward movement, outward movement of said at least two actuation projections forcing an end of said release outward; and (e) inserting a diesel nozzle into said nozzle tube, said diesel nozzle forcing said at least two actuation projections outward, said releasable door opening after said at least one release arm ceases supporting said releasable door.

* * * * *